US011476596B1

(12) United States Patent
Seekell

(10) Patent No.: US 11,476,596 B1
(45) Date of Patent: Oct. 18, 2022

(54) GROUNDING ATTACHMENT FOR RADIUS BLOCK FOR STRINGING CONDUCTORS

(71) Applicant: Robert Seekell, Kuna, ID (US)

(72) Inventor: Robert Seekell, Kuna, ID (US)

( * ) Notice: Subject to any disclaimer, the term of this patent is extended or adjusted under 35 U.S.C. 154(b) by 26 days.

(21) Appl. No.: 17/212,322

(22) Filed: Mar. 25, 2021

(51) Int. Cl.
*H01R 4/66* (2006.01)
*H01R 4/64* (2006.01)

(52) U.S. Cl.
CPC ............ *H01R 4/66* (2013.01); *H01R 4/646* (2013.01)

(58) Field of Classification Search
CPC ............ H01R 4/646; H01R 4/66; H02G 1/04
See application file for complete search history.

(56) References Cited

U.S. PATENT DOCUMENTS 3,545,724 A * 12/1970 Wright .................... H02G 1/04
254/134.3 PA
3,844,536 A 10/1974 Chadwick, Jr.
2018/0242438 A1* 8/2018 Lin .......................... H05F 3/02

FOREIGN PATENT DOCUMENTS

CN 202059103 U 11/2011

OTHER PUBLICATIONS

Tallman Equipment Co., Inc.; DDIN Grounded Helicopter Blocks; Website URL https://tallmanequipment.com/product/grounded-helicopter-blocks/; Retrieved Dec. 9, 2021.
linemansequipment.com; Nesco BTGD-1 Universal Grounding Device for Blocks up to 35"; Website URL https://linemansequipment.com/nesco-btgd-1-universal-grounding-device-for-blocks-up-to-35.html; Retrieved Dec. 9, 2021.
GMP Tools; Traveling Ground Kit; Website URL https://www.gmptools.com/traveling-ground-kit/; Retrieved Dec. 9, 2021.
linemansequipment.com; Nesco BBTV-31 Single Helicopter Block w/ Fly Arm and Ground; Website URL https://linemansequipment.com/rigging/stringing-blocks/helicopter-blocks/nesco-bttv-31-single-helicopter-block-w/-fly-arm-and-ground.html; Retrieved Dec. 9, 2021.
Ningbo Dongfang Machinery Of Power Co., Ltd.; SHG60D Steel Grounding Roller for Pilot wire rope; Website URL http://nbdf.en.hisupplier.com/product-759865-SHG60D-Steel-Grounding-Roller-for-Pilot-wire-rope.html; Retrieved Dec. 9, 2021.
Wagner Smith Equipment Co.; Grounding Attachments Spec Sheet; Website URL https://wagnersmith.com/wp-content/uploads/2021/02/STRINGING_BLOCK_GROUNDS-1.pdf; Retrieved Dec. 9, 2021.

* cited by examiner

*Primary Examiner* — Oscar C Jimenez
*Assistant Examiner* — Paul D Baillargeon
(74) *Attorney, Agent, or Firm* — Scott D. Swanson; Shaver & Swanson

(57) ABSTRACT

A grounding attachment for use with a CRS Roller. The grounding attachment has a body having two arms. Each arm is pivotally attached to the body. The arms are configured to be biased downward onto a conductor positioned on the CRS Roller. Preferably a torsion spring biases the arms downward such that a roller attached to each arm rests on a conductor positioned within the radius block. Energy is conducted from the conductor, through the roller and arm to a grounding lug that is configured for a lineworker to attach a ground to the grounding device to allow the energy to reach the earth.

19 Claims, 6 Drawing Sheets

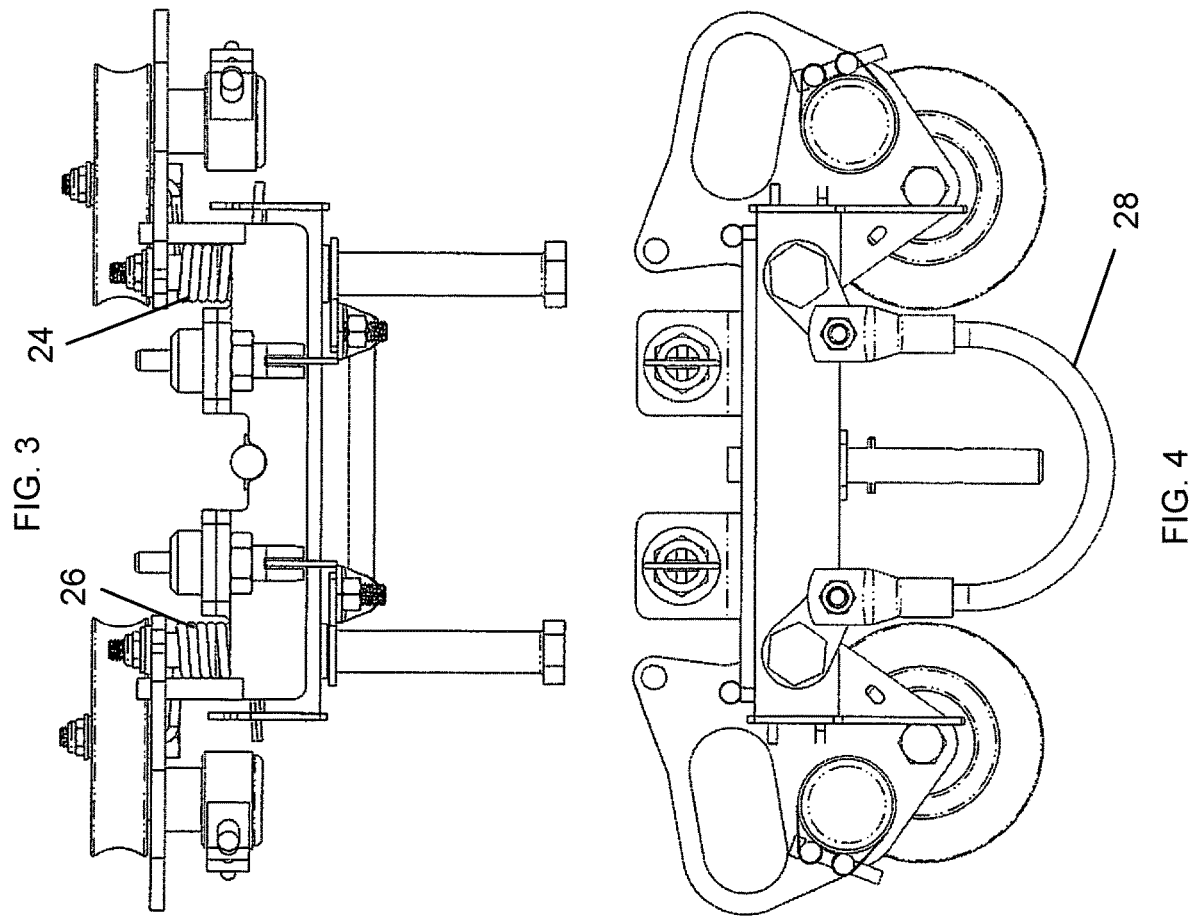

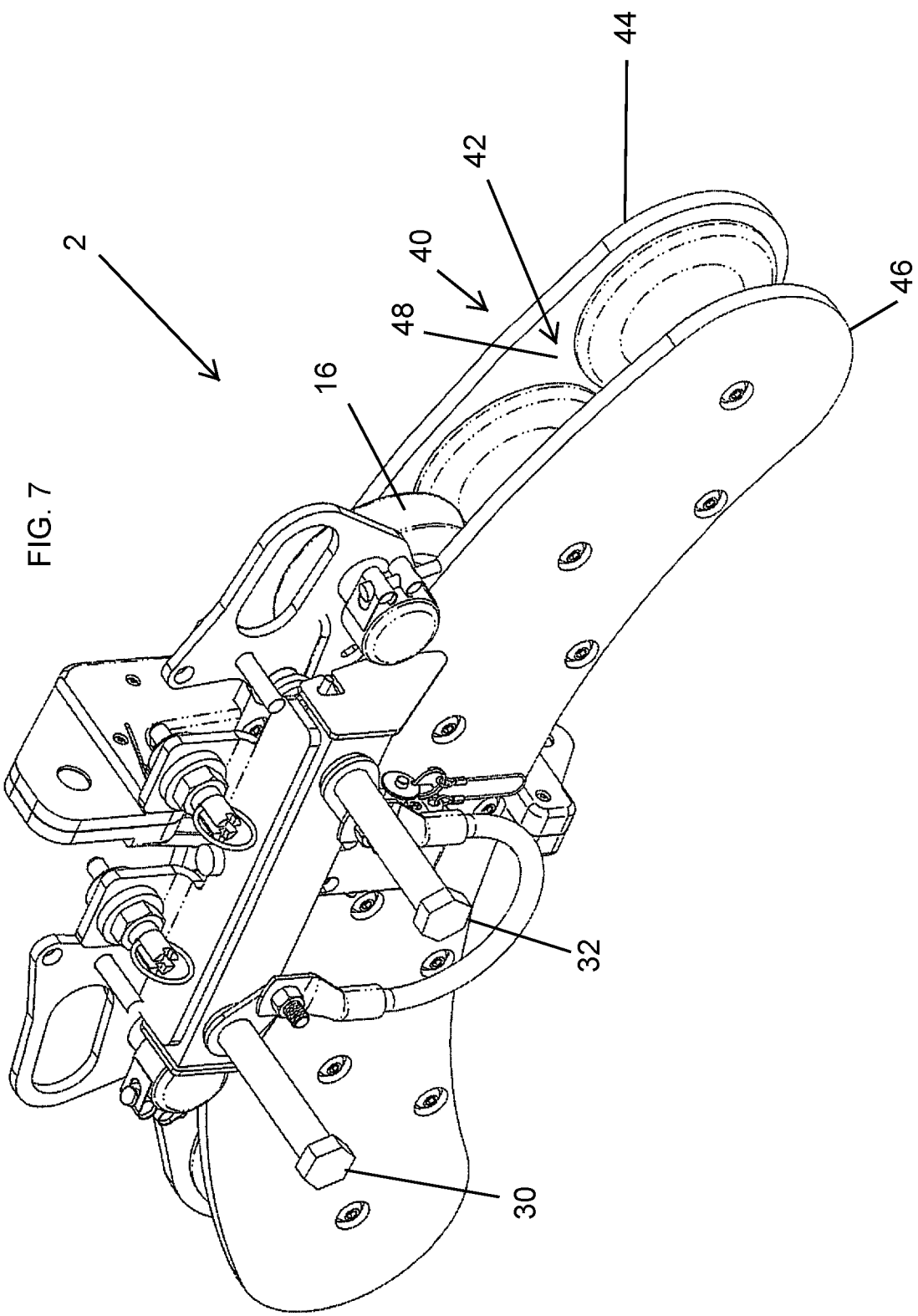

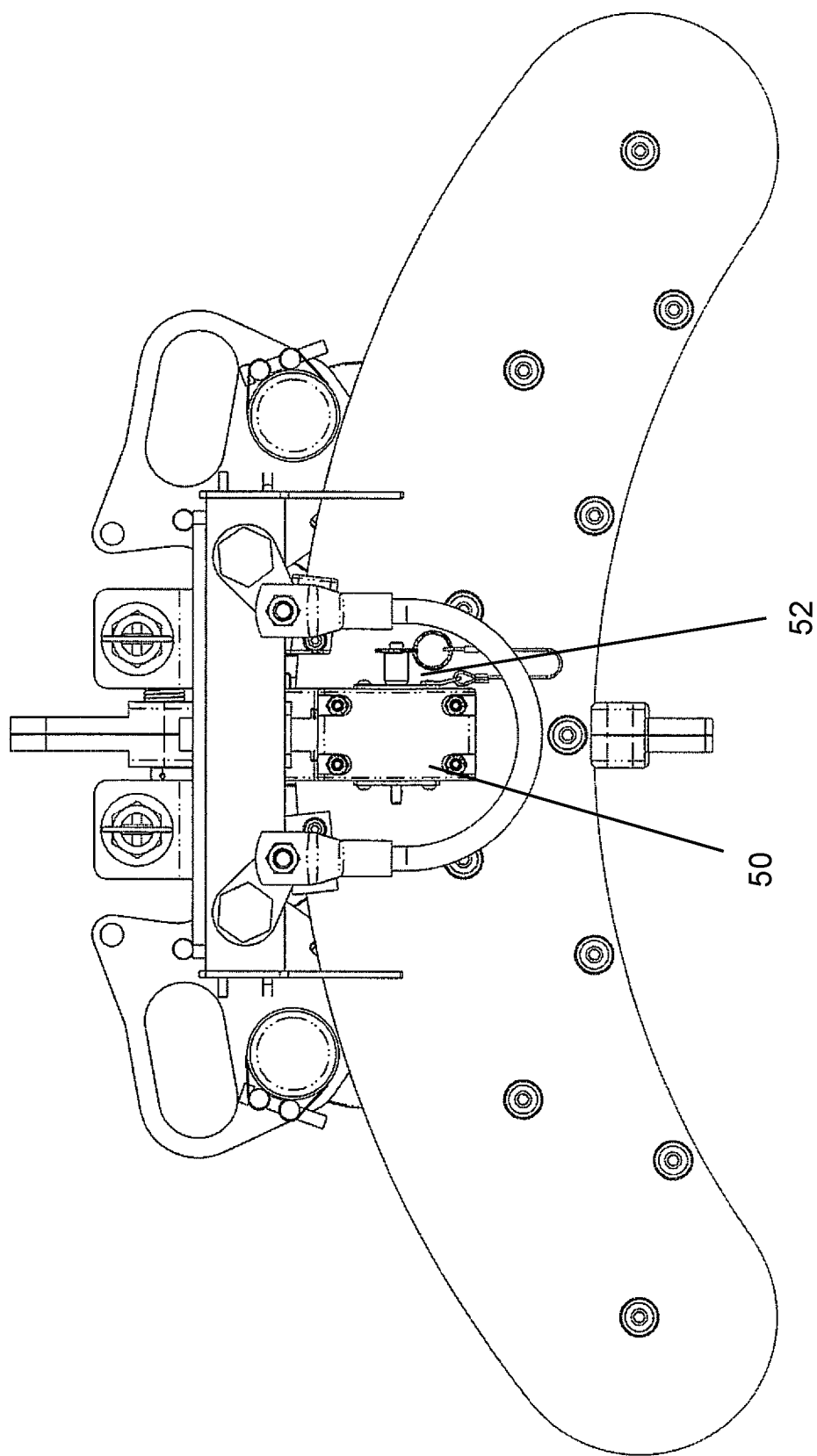

GROUNDING ATTACHMENT FOR RADIUS BLOCK FOR STRINGING CONDUCTORS

TECHNICAL FIELD

The presently disclosed technology relates to the field of grounding an aerial power conductor. More particularly, the present invention is a grounding attachment for grounding an electrical conductor positioned on a stringing block.

BACKGROUND

Electric power distribution is the final stage in the delivery of electric power; it carries electricity from the transmission system to individual consumers. Distribution substations connect to the transmission system and lower the transmission voltage to medium voltage ranging between 2 kV and 35 kV with the use of transformers.

Primary distribution lines carry this medium voltage power to distribution transformers located near the customer's premises. Distribution transformers again lower the voltage to the utilization voltage used by lighting, industrial equipment or household appliances.

Often several customers are supplied from one transformer through secondary distribution lines. Commercial and residential customers are connected to the secondary distribution lines through service drops.

The transition from transmission to distribution happens in a power substation, which has the following functions:

(1): Circuit breakers and switches enable the substation to be disconnected from the transmission grid or for distribution lines to be disconnected.

(2): Transformers step down transmission voltages, 35 kV or more, down to primary distribution voltages. These are medium voltage circuits, usually 600-35,000 V.

(3): From the transformer, power goes to the busbar that can split the distribution power off in multiple directions. The bus distributes power to distribution lines, which fan out to customers.

Urban distribution can be done underground or overhead. Rural distribution is mostly above ground with utility poles, and suburban distribution is a mix. Closer to the customer, a distribution transformer steps the primary distribution power down to a low-voltage secondary circuit, usually 120/240 V in the US for residential customers. The power comes to the customer via a service drop and an electricity meter. The final circuit in an urban system may be less than 50 feet (15 m), but may be over 300 feet (91 m) feet for a rural customer.

Electricity is delivered at a frequency of 60 Hz, in the US. It is delivered to domestic customers as single-phase or three phase electric power. Three-phase power is more efficient in terms of power delivered per cable used, and is more suited to running large electric motors. Some large appliances may be powered by three-phase power, such as electric stoves and clothes dryers.

A ground connection is normally provided for the customer's system as well as for the equipment owned by the utility. The purpose of connecting the customer's system to ground is because each electrical appliance to run properly needs a low resistance ground source and an energized conductor. The system neutral runs from the distribution substation that is connected to the ground grid and transitions from pole to pole through out the distribution circuits.

When a new conductor is introduced into the electrical distribution system, whether it be transmission, sub transmission or distribution, there is a need to run the wires from structure to structure. The structures can be wood poles, metal poles, lattice towers or fiberglass poles. Most often on main distribution lines, the structure will have four (4) conductors on each pole and sometimes double circuits that could be eight (8) or more conductors. The wires or conductor might run one to four (1-4) miles in town, about forty (18) poles per mile. Each conductor needs a roller to help transition the conductor from structure to structure. In town distribution poles have an average spacing of about 132 feet to 200 ft. Line workers install rollers on top of a crossarm or utility arm or hang under an insulator to pull in rope that pulls in the new conductor. The term roller as used herein is used to define blocks with single rollers (such as those that have the appearance of a pulley as well as the inventor's RADIUS block which has a series of rollers as opposed to a single pulley). When there are existing energized conductors on the crossarm or utility arm, line workers have to move the energized conductors to fiberglass temp arms that attach to existing crossarm or utility arms. The reason for this step is to make room to install the rollers to the crossarm or utility arm to pull in the conductor, without having to de-energize the lines and thus cutting power to the end user(s).

The rollers that are used today are typically aluminum construction, which is a conductive material. When the line workers are installing, they are very close to energized existing conductors. There have been many cases in the US where the line workers are injured due to contact with energized parts in their work zone. If the angle needs to be corrected after stringing operation starts the worker needs to remove the conductor, correct the angle on the roller and then reinstall the conductor in the roller.

In contrast to the typical roller, the inventor has invented a new roller that is disclosed, for example, in U.S. Pat. No. 10,763,648. The stringing block utilizes a series of rollers positioned between two sides of the body of the roller. This allows the conductor to travel across the series of rollers, as opposed to the single roller style of the prior style rollers.

To avoid potential fatal hazards or issues with a new deenergized conductor jumping, or sagging into a energized conductor unexpectedly when pulling in, typically the line being worked on is provided with a ground source. The new conductor being worked on or while string from pole to pole must be per OSHA law must be grounded. The ground connection will dissipate any unwanted charge traveling on the line protecting the worker and equipment. This ground provides a ground connection for the energy to reach the ground. What is needed is an improved grounding device for use with more modern stringing blocks, such as the stringing block disclosed in U.S. Pat. No. 10,763,648.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The inventor has devised a new, improved grounding device for use with the inventor's improved arm roller (also called a stringing block or radius block) disclosed in U.S. Pat. No. 10,763,648. This style roller typically has a female receptacle configured for attachment of an accessory, such as the stringing arm (120) shown in FIG. 1 of U.S. Pat. No. 10,763,648. Alternate attachment mechanisms can be utilized.

A grounding attachment for a stringing block for an energy conductor. The stringing block having a channel defined by two opposing walls and having a floor having a series of stringing rollers. The channel being configured for placement therein of an energy conductor such that the energy conductor is placed on the stringing rollers. The grounding attachment is configured to attach to the stringing block.

The grounding attachment has a body. The body preferably is configured to attach to the stringing block by a male extension that is configured for mating engagement with a female receptacle of the stringing block. The body is configured to extend parallel to and above the channel of the stringing block when the grounding attachment is attached to the stringing block.

The grounding attachment has at least one arm pivotally connected to the body. Preferably the grounding attachment has two arms, namely a first arm and a second arm, in a spaced apart relationship to one another, with each arm being pivotally connected to the body. The arms are biased downward toward the floor of the channel so as to contact a conductor positioned within the channel. Each arm has a roller attached to the arm. The roller is configured to spin (or roll) on the conductor as the conductor is pulled through the stringing block. Each roller is electrically conductive, preferably constructed of aluminum or copper. The rollers are configured such that when the grounding attachment is attached to the stringing block each roller is positioned above the channel of the stringing roller.

Each arm is biased to pivot downward so as to assert force onto a conductor positioned between each roller and the stringing rollers of the stringing block when the grounding attachment is connected to the stringing block. This allows energy from the conductor to transfer to each roller. Preferably each arm is biased by a torsion spring, although other biasing mechanisms can be utilized. The grounding attachment has grounding lug configured for attachment to a ground. The ground is installed by a lineworker to connect the grounding attachment to ground such that energy from the conductor is grounded. The grounding lug thus in electrical connection with roller(s). The grounding lug(ss) are in electrical connection with the roller(s) on each arm. Each grounding lug is preferably made of copper. Preferably two grounding lugs are provided with one on each side of the body of the grounding attachment. This allows for a lineworker to chose either lug for attaching a ground thereto. The grounding lugs are preferably configured to receive electricity from either or all of rollers, such as by one or more jumpers connecting the grounding lugs. Preferably the grounding lugs extend through the body, with the arms each being pivotally connected to a lug.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF THE DRAWINGS

FIG. 3 illustrates a top isometric view of a grounding attachment.

FIG. 4 illustrates a side isometric view of a grounding attachment.

FIG. 7 illustrates a perspective view of a grounding attachment attached to a radius block.

FIG. 8 illustrates a front isometric view of a grounding attachment attached to a SAR roller.

DETAILED DESCRIPTION OF THE PREFERRED EMBODIMENTS

Figure 2:
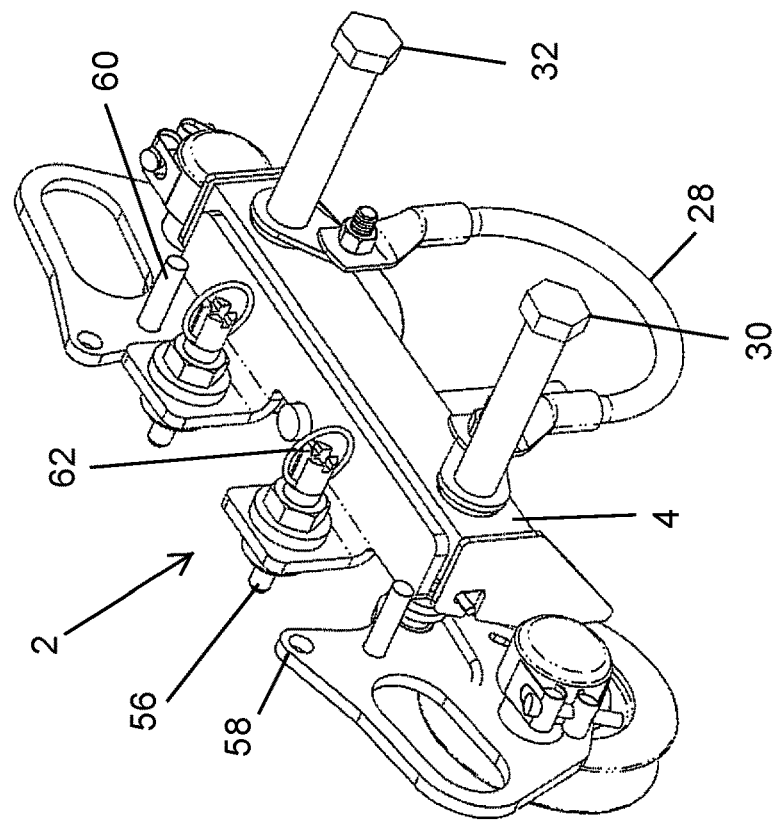
FIG. 2 illustrates a perspective view of a grounding attachment.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
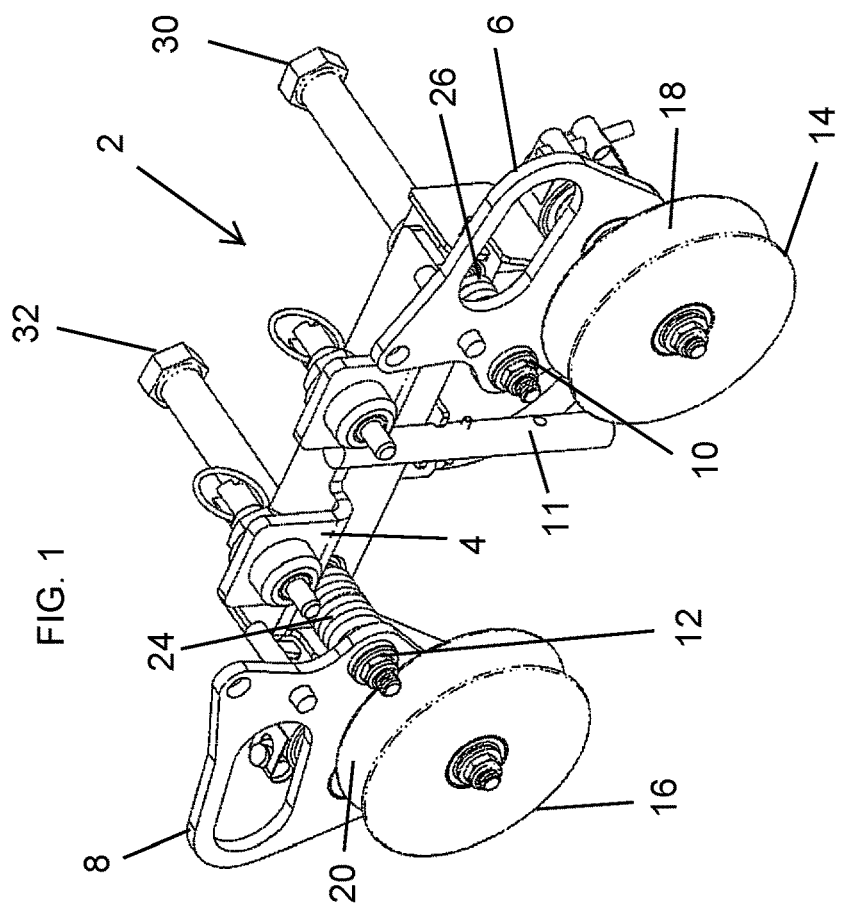
FIG. 1 illustrates a perspective view of a grounding attachment.

FIG. 1 illustrates a perspective view of a preferred embodiment of a grounding attachment for a stringing roller. The stringing block is utilized for overhead stringing of conductor line, for example for power line conducting. The stringing block 2 is configured with a body 4. The body has two arms 6, 8 attached to the body. The arms are attached to the body via rotational or pivotal connection. The arms are configured so as to exert a downward force on the rollers 14, 16. The rollers are attached to the arms preferably such that the rollers can roll as a conductor is passed beneath each pulley. The grounding attachment is configured to attach to a stringing block via grounding lugs 30, 32. Tensioners 24, 26 apply downward pressure to the stringing arms. Each roller 14, 16 has a circumferential channel 18 for passage thereon of a conductor. Each arm is connected to the body via a pivot 10, 12. In a preferred embodiment and as depicted in the figures, the tensioners are torsion springs 24, 26.

In the depicted embodiment each arm is configured to pivotally rotate about the grounding lugs 30, 32 such that the pivot shown in FIG. 1 and two as 10, 12 is the end of the grounding lug. The top of the base has two extensions which serve as a stop for rotation of the arms toward the center. Each arm has a rotation stop 60 extending from the arm that is configured to inhibit rotation of the arm once the stop 60 reaches the extension. In a preferred embodiment the extensions each have a pin 56 that is configured for insertion into the opening 58 on the arm so as to lock or retain the arm in an upward position so as to arrest the downward rotation of the arm. In the depicted embodiment each pin has a ring 62 configured for facilitating release of the pin as well as for locking the pin in position.

FIG. 2 depicts a perspective view from the opposite side of the grounding attachment as FIG. 1. FIG. 1 further illustrates grounding lugs 30, 32. A jumper 28 is attached to the grounding lugs. The grounding lugs 30, 32 are in electrical connection to the rollers via electrically conductive arms. The grounding attachment is configured such that when the rollers 14, 16 are biased downward onto a conductor positioned between the rollers and the rollers of a radius block, the pressure of the rollers allows for electricity conducted in the conductor to travel through each roller, through the arm, and to the grounding lugs. The grounding lugs extend through the body such that the arms are preferably pivotally connected on the end of each bolt, although alternate design can be utilized.

FIG. 3 illustrates a top view of the grounding attachment.

FIG. 4 illustrates a side isometric view of the grounding attachment.

Figure 5:
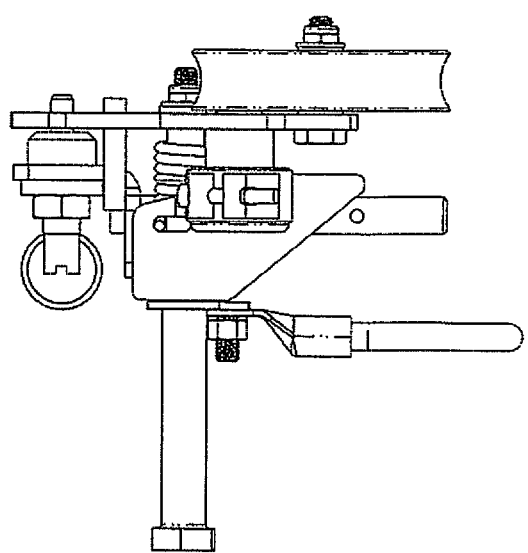
FIG. 5 illustrates a side isometric view of a grounding attachment.

FIG. 5 illustrates a side isometric view of the grounding attachment.

Figure 6:
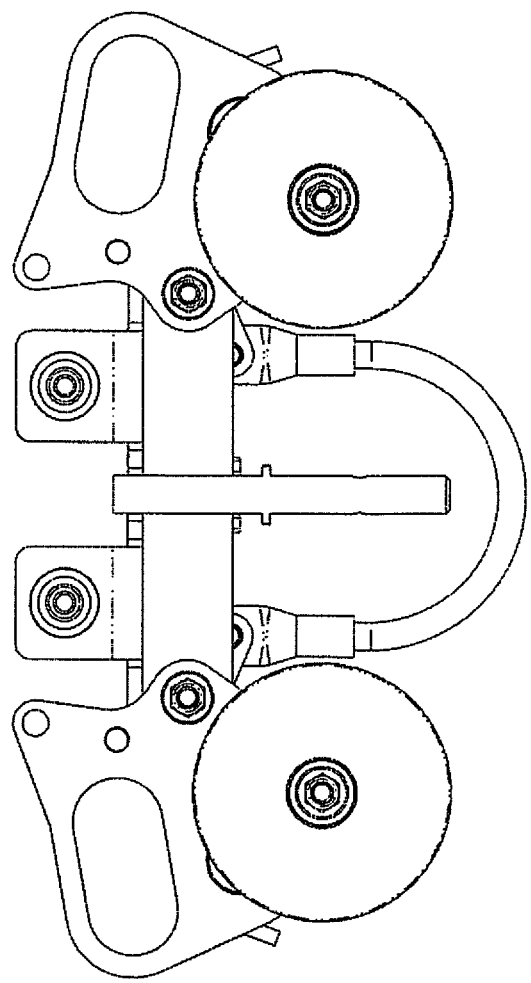
FIG. 6 illustrates a side isometric view of a grounding attachment.

FIG. 6 illustrates a front isometric view of the grounding attachment.

FIG. 7 illustrates a perspective view of a grounding attachment 2 connected to a radius block 40. The roller has two opposing walls 44, 46 that are separated by rollers 48 that extend through the body of the roller. The grounding attachment is connected to the roller by positioning the connection arm 11 into a female receiver 50 and inserting a pin 52 through a wall of the receiver and through the pin opening 13 of the extension.

FIG. 8 illustrates a front isometric view of a radius block and grounding attachment. The male extension of the grounding attachment has been inserted into a female receiver 50 of the radius block with a pin 52 retaining the grounding attachment male extension in the female receptacle.

Figure 9:
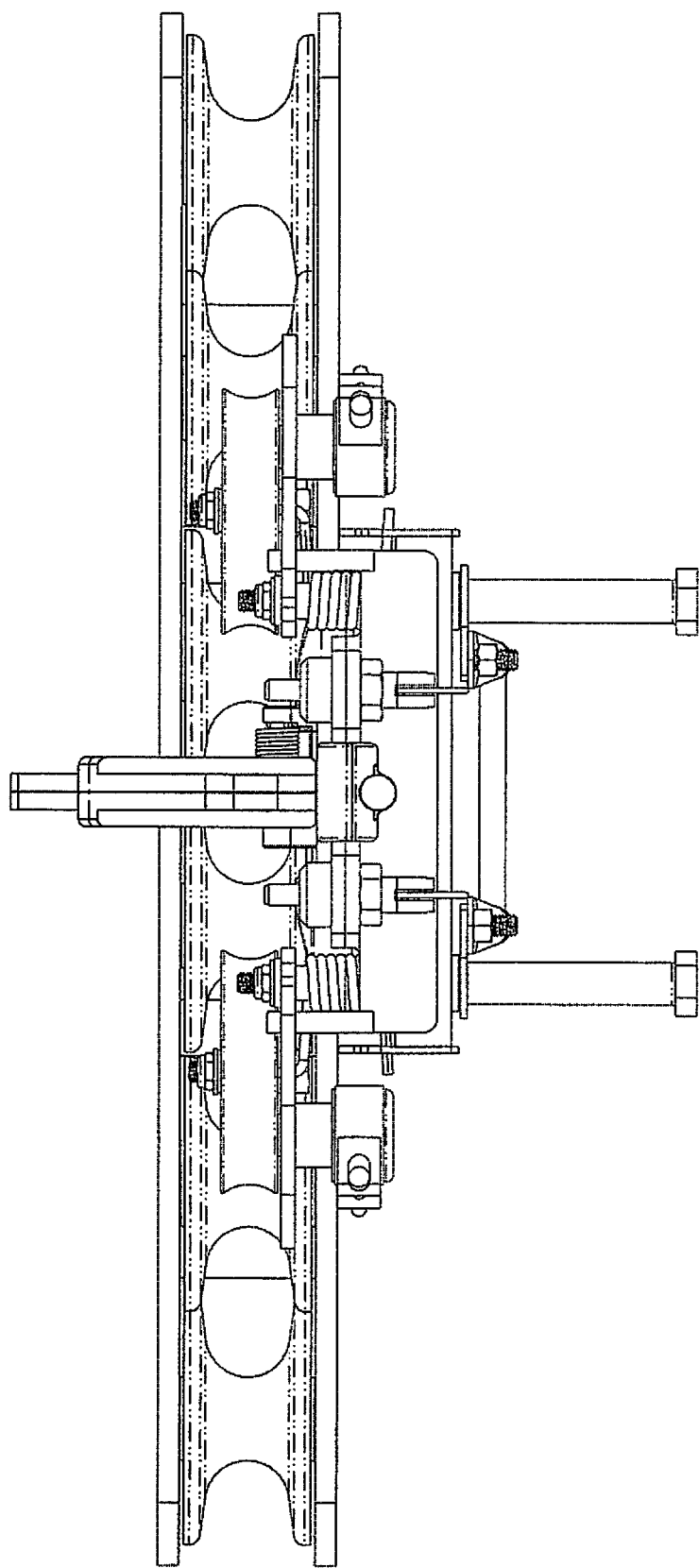
FIG. 9 illustrates a top isometric view of a grounding attachment attached to a radius block.

FIG. 9 is a top isometric view of a grounding attachment connected to a radius block. The overlay of the two rollers of the grounding attachment are shown over the channel created in the radius block. The two rollers of the grounding attachment are configured with torsion springs to exert pressure downward onto a conductor positioned within the channel created by the radius block. This allows for any electricity to be grounded through the grounding attachment to the ground.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A grounding attachment for a stringing block for an energy conductor, the stringing block having a channel defined by two opposing walls and having a floor comprising a series of stringing rollers, the channel being configured for placement therein of an energy conductor, said grounding attachment comprising:
    a body, wherein said body is configured to extend parallel to the channel of the roller when said grounding attachment is attached to the stringing block;
    a first arm pivotally attached to said body;
    a first roller attached to said first arm, wherein said first roller is electrically conductive, wherein said first roller and said first arm is configured such that when said grounding attachment is attached to the stringing block said first roller is positioned above the channel of the stringing block;
    wherein said first arm is biased to pivot downward so as to assert force onto a conductor positioned between said first roller and the stringing rollers of the stringing block when said grounding attachment is connected to the stringing block to allow energy from the conductor to transfer to the first roller;
    a grounding lug configured for attachment to a ground, wherein said grounding lug is in electrical connection with said first roller; and
    wherein said grounding attachment is configured to attach to the stringing block.

2. The grounding attachment of claim 1, wherein said first arm is biased by a torsion spring.

3. The grounding attachment of claim 1, wherein said first roller comprises a material selected from the group consisting of aluminum and copper.

4. The grounding attachment of claim 1, wherein said grounding attachment comprises a pair of grounding lugs.

5. The grounding attachment of claim 4, wherein said grounding attachment comprises a jumper extending between said pair of grounding lugs.

6. The grounding attachment of claim 1, wherein said grounding lug comprises copper.

7. The grounding attachment of claim 1 wherein said grounding lug extends through said body, wherein said first arm is pivotally attached to said grounding lug to attach said first arm to said body.

8. The grounding attachment of claim 1, wherein the stringing block comprises a female receptacle an outer surface of the stringing block for attachment of an accessory device, wherein said grounding attachment comprises a male extension configured for mating engagement with the female receptacle of the stringing block.

9. The grounding attachment of claim 1 further comprising a second arm pivotally attached to said body, wherein said first arm and said second arm are in a spaced apart relationship, wherein a second roller is attached to said second arm, wherein said second roller is electrically conductive, wherein said second roller and said second arm are configured such that when said grounding attachment is attached to the stringing block said first roller is positioned above the channel of the stringing block; and
    wherein said second arm is biased to pivot downward so as to assert force onto the conductor positioned between said second roller and the stringing rollers of the stringing block when said grounding attachment is connected to the stringing block to allow energy from the conductor to transfer to the second roller.

10. The grounding attachment of claim 1 wherein said body comprising a male extension configured for mating engagement with the female receptacle of the stringing block to attach said grounding attachment to the stringing block.

11. A grounding attachment for a stringing block for an energy conductor, the stringing block having a channel defined by two opposing walls and having a floor comprising a series of stringing rollers, the channel being configured for placement therein of an energy conductor, said grounding attachment comprising:
    a body, wherein said body is configured to attach to the stringing block, wherein said body is configured to extend parallel to the channel of the roller when said grounding attachment is attached to the stringing block;

a first arm and a second arm pivotally attached to said body and in a spaced apart relationship to each other;

a first roller attached to said first arm and a second roller attached to said second arm, wherein said first roller and said second roller are electrically conductive, wherein said first roller and said second roller and said arms are configured such that when said grounding attachment is attached to the stringing block said first roller and said second roller are positioned above the channel of the stringing block;

wherein said first arm and said second arm are biased to pivot downward so as to assert force onto a conductor positioned between said first roller, said second roller, and the stringing rollers of the stringing block when said grounding attachment is connected to the stringing block to allow energy from the conductor to transfer to the first roller and the second roller;

a grounding lug configured for attachment to a ground, wherein said grounding lug is in electrical connection with said first roller; and wherein said grounding attachment is configured to attach to the stringing block.

12. The grounding attachment of claim 11, wherein said first arm and said second arm are each biased by a torsion spring.

13. The grounding attachment of claim 11, wherein said first roller and said second roller comprise a material selected from the group consisting of aluminum and copper.

14. The grounding attachment of claim 11, wherein said grounding attachment comprises a pair of lugs.

15. The grounding attachment of claim 14, wherein said grounding attachment comprises a jumper extending between said pair of grounding lugs.

16. The grounding attachment of claim 15 wherein said grounding lugs extend through said body, wherein said grounding lugs comprise a first grounding lug and a second grounding lug, wherein said first arm is pivotally attached to said first grounding lug to attach said first arm to said body, wherein said second grounding lug is attached to said second arm to attach said second arm to said body.

17. The grounding attachment of claim 11, wherein said grounding lug comprises copper.

18. The grounding attachment of claim 11, wherein the stringing block comprises a female receptacle for attachment of accessory devices, wherein said grounding attachment comprises a male extension configured for mating engagement with the female receptacle of the stringing block.

19. The grounding attachment of claim 11, wherein said body comprising a male extension configured for mating engagement with the female receptacle of the stringing block to attach said grounding attachment on the stringing block.

* * * * *